(12) United States Patent
Yamada et al.

(10) Patent No.: US 7,463,430 B2
(45) Date of Patent: Dec. 9, 2008

(54) DIFFRACTION ELEMENT, OBJECTIVE LENS UNIT, OPTICAL PICKUP, OPTICAL DISC APPARATUS AND DESIGN METHOD FOR DIFFRACTION ELEMENT

(75) Inventors: Takatoshi Yamada, Kanagawa (JP); Satoshi Kawakita, Tokyo (JP); Jin Sato, Miyagi (JP); Kyu Kanno, Miyagi (JP); Motoo Aiba, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 11/683,093

(22) Filed: Mar. 7, 2007

(65) Prior Publication Data

US 2007/0258345 A1 Nov. 8, 2007

(30) Foreign Application Priority Data

Mar. 31, 2006 (JP) ............................. 2006-098707

(51) Int. Cl.
*G02B 13/18* (2006.01)
*G02B 5/18* (2006.01)
*G11B 7/00* (2006.01)

(52) U.S. Cl. .................. 359/719; 359/571; 369/112.04; 369/112.05

(58) Field of Classification Search ......... 359/717–719, 359/571; 369/112.03, 112.04, 112.05, 112.06, 369/112.07
See application file for complete search history.

(56) References Cited

U.S. PATENT DOCUMENTS 7,227,704 B2 * 6/2007 Koike ......................... 359/719
7,260,047 B2 * 8/2007 Nishioka et al. ........ 369/112.05

FOREIGN PATENT DOCUMENTS

JP 2005-302270 10/2005

OTHER PUBLICATIONS

U.S. Appl. No. 11/350,057, filed Feb. 9, 2006, Yoshito Asoma.

* cited by examiner

*Primary Examiner*—Scott J Sugarman
(74) *Attorney, Agent, or Firm*—Oblon, Spivak, McClelland, Maier & Neustadt, P.C.

(57) ABSTRACT

The first and second materials of the diffraction element are selected such that the first material's refraction indexes $n1(\lambda 1)$, $n1(\lambda 2)$ and $n1(\lambda 3)$ for the first, second and third wavelengths $\lambda 1$, $\lambda 2$ and $\lambda 3$ and the second material's refraction indexes $n2(\lambda 1)$, $n2(\lambda 2)$ and $n2(\lambda 3)$ for the first, second and third wavelengths $\lambda 1$, $\lambda 2$ and $\lambda 3$ satisfy one of the conditions (1) or (2).

7 Claims, 9 Drawing Sheets

| WAVELENGTH | λb | λd | λc |
|---|---|---|---|
| UPPER LAYER DIFFRACTION GRATING DGx | ZERO-ORDER TYPE | ZERO-ORDER TYPE | FIRST-ORDER TYPE |
| LOWER LAYER DIFFRACTION GRATING DGy | ZERO-ORDER TYPE | FIRST-ORDER TYPE | ZERO-ORDER TYPE |

FIRST COMBINATION

FIG.7A

| WAVELENGTH | λb | λd | λc |
|---|---|---|---|
| UPPER LAYER DIFFRACTION GRATING DGx | ZERO-ORDER TYPE | ZERO-ORDER TYPE | FIRST-ORDER TYPE |
| LOWER LAYER DIFFRACTION GRATING DGy | ZERO-ORDER TYPE | FIRST-ORDER TYPE | FIRST-ORDER TYPE |

SECOND COMBINATION

FIG.7B

| WAVELENGTH | λb | λd | λc |
|---|---|---|---|
| FIRST DIFFRACTION GRATING DG1 | ZERO-ORDER TYPE | ZERO-ORDER TYPE | FIRST-ORDER TYPE |
| SECOND DIFFRACTION GRATING DG2 | ZERO-ORDER TYPE | FIRST-ORDER TYPE | FIRST-ORDER TYPE |

POSSIBLE COMBINATIONS OF DIFFRACTION GRATINGS

FIG.7C

| WAVELENGTH | 408nm | 655nm | 785nm |
|---|---|---|---|
| REFRACTION INDEXES OF POLYOLEFIN RESIN | 1.52455 | 1.50625 | 1.50316 |
| REFRACTION INDEXES OF ACRYLIC ULTRAVIOLET CURABLE RESIN | 1.65453 | 1.60701 | 1.60147 |

DIFFRACTION ELEMENT, OBJECTIVE LENS UNIT, OPTICAL PICKUP, OPTICAL DISC APPARATUS AND DESIGN METHOD FOR DIFFRACTION ELEMENT

CROSS REFERENCES TO RELATED APPLICATIONS

The present invention contains subject matter related to Japanese Patent Application JP2006-098707 filed in the Japanese Patent Office on Mar. 31, 2006, the entire contents of which being incorporated herein by reference.

BACKGROUND OF THE INVENTION

1. Field of the Invention

The present invention relates to a diffraction element, objective lens unit, optical pickup, optical disc apparatus and design method for a diffraction element, and is preferably applied to an optical disc device, for example.

2. Description of Related Art

In recent years, there is an optical disc device that supports a plurality of types of optical discs: "Blu-ray Disc (Registered Trademark)" (BD) along with well-known formats such as Compact Disc (CD) and Digital Versatile Disc (DVD).

The optical disc device chooses one of the following types of optical beam in accordance with the format of an optical disc inserted: approximately 780 nm wavelength of optical beam for CD, around 660 nm wavelength of optical beam for DVD or about 405 nm wavelength of optical beam for BD.

By the way, it is desirable that the optical disc device be equipped with an objective lens that supports the three types of wavelengths to be simplified and downsized: The objective lens is installed in an optical pickup that emits an optical beam to an optical disc.

However, different wavelengths of optical beams are used for CD, DVD and BD formats. In addition, their protection layers are different in thickness (or the distances from lower surfaces of the optical discs to their signal recording surfaces are different). Moreover, their numerical apertures for objective lens are different.

Accordingly, it is difficult to design the objective lens that supports the three types of wavelengths. It is difficult to obtain one with good characteristics because of lower transmission efficiency and aberration of optical beams and the like.

Therefore, correcting the aberration of optical beams is one way to cope with the above problem: a diffraction element that selectively diffracts particular wavelengths of optical beams may be used along with the objective lens.

For instance, there is an optical disc device equipped with a diffraction element that only diffracts an optical beam for CD while optical beams for DVD and BD are not diffracted: the diffraction element has two different refraction indexes of substances and a step-like diffraction pattern formed in between these substances (see Jpn. Pat. Laid-open Publication No. 2005-302270 (Pages 15-19 and FIG. 12), for example). The optical beams for CD, DVD and BD are also referred to as a "CD-type optical beam", "DVD-type optical beam" and "BD-type optical beam", respectively.

SUMMARY OF THE INVENTION

Generally, materials which the optical beams pass through have different refraction indexes for each wavelength. In addition, the refraction indexes vary according to the materials.

Accordingly, if a suitable material is selected in a process of designing the diffraction element, both the diffraction efficiency of the CD-type optical beam and the transmission efficiency of BD- and DVD-type optical beams may rise. This improves the characteristics of the diffraction element.

If one can select a material based on certain criteria, its refraction indexes for each wavelength may be determined and the diffraction and transmission efficiencies of the diffraction element may be calculated. However, the criteria for selecting materials are not clearly defined to have good characteristics and to improve the diffraction and transmission efficiencies of optical beams.

Accordingly, there is a high possibility that the material be selected inappropriately. It means that the diffraction element having good characteristics can hardly be designed.

The present invention has been made in view of the above points and is intended to provide a diffraction element, objective lens unit, optical pickup and optical disc apparatus with good characteristics and a design method that allows easy designing of a diffraction element with good characteristics.

In one aspect of the present invention, a design method for designing a diffraction element including a first and second layer attached to one another and a diffraction pattern in which each of step-like protruding portions located at predetermined intervals between the first and second layers includes s steps wherein the first and second layers are respectively made from a first and second material through which a first, second and third wavelength $\lambda 1$, $\lambda 2$ and $\lambda 3$ of an optical beam passes, includes a selection step of selecting the first material and the second material such that the first material's refraction indexes $n1(\lambda 1)$, $n1(\lambda 2)$ and $n1(\lambda 3)$ for the first, second and third wavelengths $\lambda 1$, $\lambda 2$ and $\lambda 3$ and the second material's refraction indexes $n2(\lambda 1)$, $n2(\lambda 2)$ and $n2(\lambda 3)$ for the first, second and third wavelengths $\lambda 1$, $\lambda 2$ and $\lambda 3$ satisfy one of the conditions (1) or (2).

Accordingly, it is easily determined that, when the refraction indexes $n1$ and $n2$ of the first and second materials for each wavelength $\lambda$ satisfy the condition (1), the diffraction element diffracts the third wavelength $\lambda 3$ without diffracting the first and second wavelengths $\lambda 1$ and $\lambda 2$. It is also determined that, when the condition (2) is satisfied, the diffraction element diffracts the second and third wavelengths $\lambda 2$ and $\lambda 3$ without diffracting the first wavelength $\lambda 1$. This allows easy selection of materials suitable for the diffraction element.

In another aspect of the present invention, a diffraction element includes: a first and second layer attached to one another; and a diffraction pattern in which each of step-like protruding portions located at predetermined intervals between the first and second layers includes s steps, wherein: the first layer and second layer are respectively made from a first and second material through which a first, second and third wavelength $\lambda 1$, $\lambda 2$ and $\lambda 3$ of an optical beam passes; and the first material and the second material are selected such that the first material's refraction indexes $n1(\lambda 1)$, $n1(\lambda 2)$ and $n1(\lambda 3)$ for the first, second and third wavelengths $\lambda 1$, $\lambda 2$ and $\lambda 3$ and the second material's refraction indexes $n2(\lambda 1)$, $n2(\lambda 2)$ and $n2(\lambda 3)$ for the first, second and third wavelengths $\lambda 1$, $\lambda 2$ and $\lambda 3$ satisfy one of the conditions (1) or (2).

Accordingly, when the refraction indexes $n1$ and $n2$ of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$.

In another aspect of the present invention, an objective lens unit includes: a diffraction element including a first and second layer attached to one another and a diffraction pattern in which each of step-like protruding portions located at predetermined intervals between the first and second layers includes s steps, the first and second layers being respectively made from a first and second material through which a first, second and third wavelength $\lambda 1$, $\lambda 2$ and $\lambda 3$ of an optical beam passes; and an objective lens collecting the first, second or third wavelength $\lambda 1$, $\lambda 2$ or $\lambda 3$ of the optical beam from the diffraction element, wherein the first material and the second material are selected such that the first material's refraction indexes $n1(\lambda 1)$, $n1(\lambda 2)$ and $n1(\lambda 3)$ for the first, second and third wavelengths $\lambda 1$, $\lambda 2$ and $\lambda 3$ and the second material's refraction indexes $n2(\lambda 1)$, $n2(\lambda 2)$ and $n2(\lambda 3)$ for the first, second and third wavelengths $\lambda 1$, $\lambda 2$ and $\lambda 3$ satisfy one of the conditions (1) or (2).

Accordingly, when the refraction indexes n1 and n2 of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$. The objective lens therefore can collect the first, second or third wavelength $\lambda 1$, $\lambda 2$ or $\lambda 3$ of the optical beam.

In another aspect of the present invention, an optical pickup includes: a first light source emitting a first wavelength $\lambda 1$ of an optical beam; a second light source emitting a second wavelength $\lambda 2$ of an optical beam; a third light source emitting a third wavelength $\lambda 3$ of an optical beam; a diffraction element including a first and second layer attached to one another and a diffraction pattern in which each of step-like protruding portions located at predetermined intervals between the first and second layers includes s steps, the first and second layers being respectively made from a first and second material through which the first, second and third wavelengths $\lambda 1$, $\lambda 2$ and $\lambda 3$ of the optical beam passes; and an objective lens collecting the first, second or third wavelength $\lambda 1$, $\lambda 2$ or $\lambda 3$ of the optical beam from the diffraction element, the objective lens being integral with the diffraction element, wherein the first material and the second material are selected such that the first material's refraction indexes $n1(\lambda 1)$, $n1(\lambda 2)$ and $n1(\lambda 3)$ for the first, second and third wavelengths $\lambda 1$, $\lambda 2$ and $\lambda 3$ and the second material's refraction indexes $n2(\lambda 1)$, $n2(\lambda 2)$ and $n2(\lambda 3)$ for the first, second and third wavelengths $\lambda 1$, $\lambda 2$ and $\lambda 3$ satisfy one of the conditions (1) or (2).

Accordingly, when the refraction indexes n1 and n2 of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$. The objective lens therefore can collect the first, second or third wavelength $\lambda 1$, $\lambda 2$ or $\lambda 3$ of the optical beam.

In another aspect of the present invention, an optical disc apparatus includes an optical pickup emitting a first, second or third wavelength $\lambda 1$, $\lambda 2$ or $\lambda 3$ of an optical beam to a first, second or third optical disc, the optical pickup including: a first light source emitting the first wavelength $\lambda 1$ of the optical beam for the first optical disc; a second light source emitting the second wavelength $\lambda 2$ of the optical beam for the second optical disc; a third light source emitting the third wavelength $\lambda 3$ of the optical beam for the third optical disc; a diffraction element including a first and second layer attached to one another and a diffraction pattern in which each of step-like protruding portions located at predetermined intervals between the first and second layers includes s steps, the first and second layers being respectively made from a first and second material through which the first, second and third wavelengths $\lambda 1$, $\lambda 2$ and $\lambda 3$ of the optical beam passes; and an objective lens collecting the optical beam from the diffraction element to the first, second or third optical disc, the objective lens being integral with the diffraction element, wherein the first material and the second material are selected such that the first material's refraction indexes $n1(\lambda 1)$, $n1(\lambda 2)$ and $n1(\lambda 3)$ for the first, second and third wavelengths $\lambda 1$, $\lambda 2$ and $\lambda 3$ and the second material's refraction indexes $n2(\lambda 1)$, $n2(\lambda 2)$ and $n2(\lambda 3)$ for the first, second and third wavelengths $\lambda 1$, $\lambda 2$ and $\lambda 3$ satisfy one of the conditions (1) or (2).

Accordingly, when the refraction indexes n1 and n2 of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$. Thus, the first, second or third wavelength $\lambda 1$, $\lambda 2$ or $\lambda 3$ of the optical beam is emitted to the first, second or third optical disc.

According to one aspect of the present invention, it is easily determined that, when the refraction indexes n1 and n2 of the first and second materials for each wavelength $\lambda$ satisfy the condition (1), the diffraction element diffracts the third wavelength $\lambda 3$ without diffracting the first and second wavelengths $\lambda 1$ and $\lambda 2$. It is also determined that, when the condition (2) is satisfied, the diffraction element diffracts the second and third wavelengths $\lambda 2$ and $\lambda 3$ without diffracting the first wavelength $\lambda 1$. This allows easy selection of materials suitable for the diffraction element. Thus, the design method allows easy design of the diffraction element with good characteristics.

According to another aspect of the present invention, when the refraction indexes n1 and n2 of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$. Thus, the diffraction element presents good characteristics.

According to another aspect of the present invention, when the refraction indexes n1 and n2 of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$. The objective lens therefore can collect the first, second or third wavelength $\lambda 1$, $\lambda 2$ or $\lambda 3$ of the optical beam. Thus, the objective lens unit presents good characteristics.

According to another aspect of the present invention, when the refraction indexes n1 and n2 of the first and second materials for each wavelength $\lambda$ satisfy the condition (1) the diffraction element diffracts the third wavelength $\lambda 3$ without diffracting the first and second wavelengths $\lambda 1$ and $\lambda 2$. On the other hand, when the condition (2) is satisfied the diffraction element diffracts the second and third wavelengths $\lambda 2$ and $\lambda 3$ without diffracting the first wavelength $\lambda 1$. The objective lens therefore can collect the first, second or third wavelength $\lambda 1$, $\lambda 2$ or $\lambda 3$ of the optical beam. Thus, the optical pickup presents good characteristics.

According to another aspect of the present invention, when the refraction indexes n1 and n2 of the first and second materials for each wavelength λ satisfy the condition (1) the diffraction element diffracts the third wavelength λ3 without diffracting the first and second wavelengths λ1 and λ2. On the other hand, when the condition (2) is satisfied the diffraction element diffracts the second and third wavelengths λ2 and λ3 without diffracting the first wavelength λ1. Thus, the first, second or third wavelength λ1, λ2 or λ3 of the optical beam is emitted to the first, second or third optical disc. Accordingly, the optical disc apparatus presents good characteristics.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIGS. 7A to 7C are schematic diagrams illustrating whether diffraction occurs or not for each wavelength;

DETAILED DESCRIPTION OF PREFERRED EMBODIMENTS

An embodiment of the present invention will be described in detail with reference to the accompanying drawings.

Figure 1:
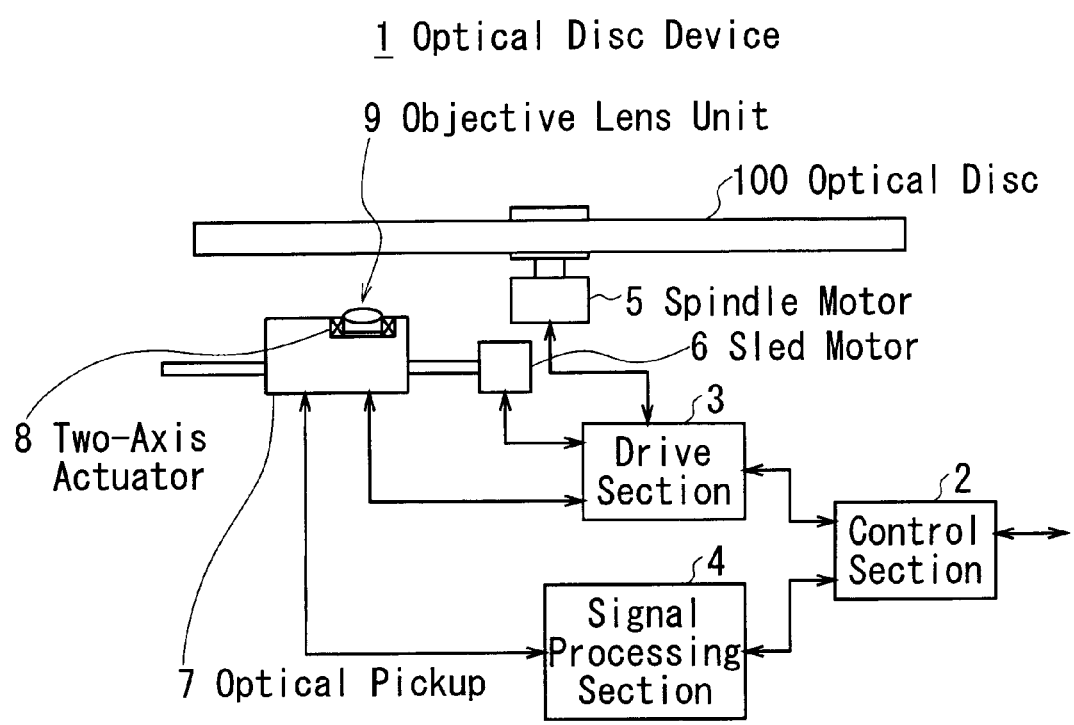
FIG. 1 is a block diagram illustrating the overall configuration of an optical disc device.

(1) Configuration of Optical Disc Device (1-1) Overall Configuration of Optical Disc Device FIG. 1 shows an optical disc device 1 that supports an optical disc 100 of CD, DVD and BD. The optical disc device 1 reproduces signals from the optical disc 100.

A control section 2 takes overall control of the optical disc device 1. After the optical disc 100 is inserted into the optical disc device 1, the control section 2 controls, in response to a playback command or the like from external devices (not shown), a drive section 3 and a signal processing section 4 to reproduce information from the optical disc 100.

The signal processing section 4 is controlled by the control section 2. The signal processing section 4 controls an optical pickup 7 to emit an optical beam to the optical disc 100 from an objective lens unit 9.

The drive section 3 under the control of the control section 2 controls a spindle motor 5 to rotate the optical disc 100 at appropriate speeds. The drive section 3 also controls a sled motor 6 to bring an optical pickup 7 in a direction of tracking or the radial direction of the optical disc 100. The drive section 3 also controls a two-axis actuator 8 to bring an objective lens unit 9 in a direction of focusing or close to the optical disc 100, or in a direction of tracking away from the optical disc 100. In this manner, the optical beam is focused on a target track on the optical disc 100.

The signal processing section 4 detects the reflection from the signal recording surface of the optical disc 100, and produces a reproduction signal based on the detected result, and then supplies the reproduction signal to an external device (not shown) through the control section 2.

The optical pickup 7 supports three types of wavelength when emitting the optical beam through the objective lens unit 9; the wavelength of 780 nm of the optical beam for the CD-type optical disc 100c; the wavelength of 650 nm of the optical beam for the DVD-type optical disc 100d; and the wavelength of 405 nm of the optical beam for the BD-type optical disc 100b.

When reproducing signals from the optical disc 100, the optical disc device 1 chooses, in accordance with the type of the optical disc 100, one of the above beams and then emits it to the optical disc 100.

(1-2) Configuration of Optical Pickup

Figure 2:
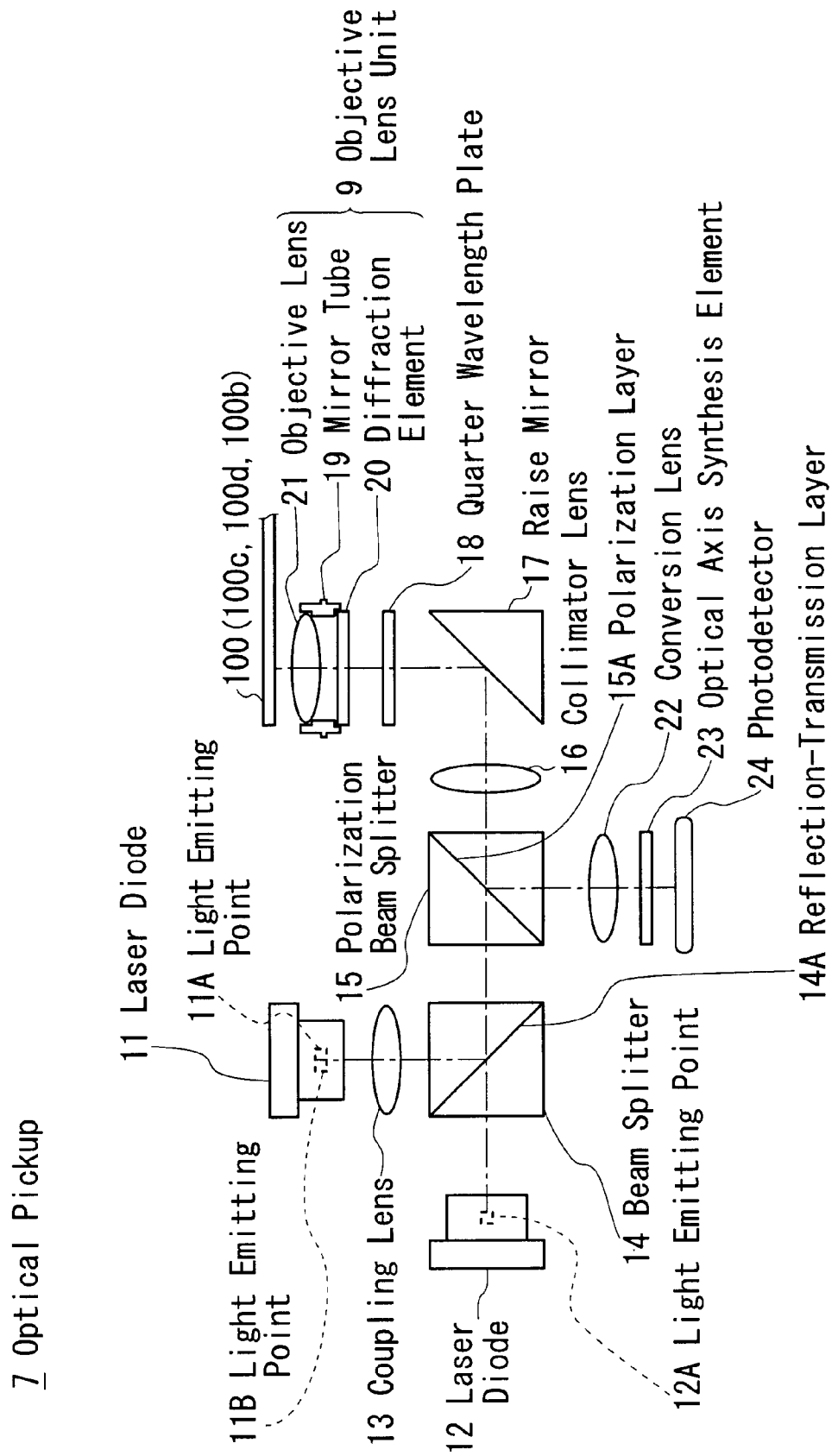
FIG. 2 is a schematic diagram illustrating the configuration of an optical pickup.

As shown in FIG. 2, the optical pickup 7 includes sources of the optical beams: a laser diode 11 to emit the optical beams of 780 and 650 nm wavelengths for the CD- and DVD-types, respectively; and a laser diode 12 to emit the optical beam of 405 nm wavelengths for the BD-type. The optical beam for CD will be also referred to as a "CD-type optical beam Lc" while the optical beam for DVD and BD will be also referred to as a "DVD-type optical beam Ld" and a "BD-type optical beam Lb", respectively.

A coupling lens 13 changes the optical magnification of the optical beam from the laser diode 11.

The optical beam of particular wavelengths is reflected on a reflection-transmission layer 14A of a beam splitter 14 while the optical beam with other wavelengths passes through the reflection-transmission layer 14A; the CD-type optical beam Lc of around 780 nm and the DVD-type optical beam Ld of about 650 nm are reflected on the reflection-transmission layer 14A while the BD-type optical beam LD of about 405 nm passes through the reflection-transmission layer 14A.

The optical beam with particular polarization angles is reflected on a polarization layer 15A of a polarization beam splitter 15 while the optical beam of other polarization angles passes through the polarization layer 15A; the incident optical beam from the beam splitter 14 passes through the polarization layer 15A while the incident optical beam from a collimator lens 16, whose polarization angles have been adjusted, is reflected on the polarization layer 15A.

The collimator lens 16 collimates the divergent light, which is the incident optical beam from the polarization beam splitter 15, and transforms the collimated optical beam from a raise mirror 17 into convergent light.

The horizontal optical beam from the collimator lens 16 is reflected on the raise mirror 17 and then travels in the vertical direction or a direction perpendicular to the optical disc 100; the vertical optical beam from a quarter wavelength plate 18 is reflected on the raise mirror 17 and then travels in the horizontal direction.

As for a part of the optical beam, its phase is delayed by one quarter of a wavelength through the quarter wavelength plate 18. This transforms the optical beam from the raise mirror 17 from linearly polarized light into circularly polarized light while it transforms the optical beam from the objective lens unit 9 from circularly polarized light into linearly polarized light.

Figure 3:
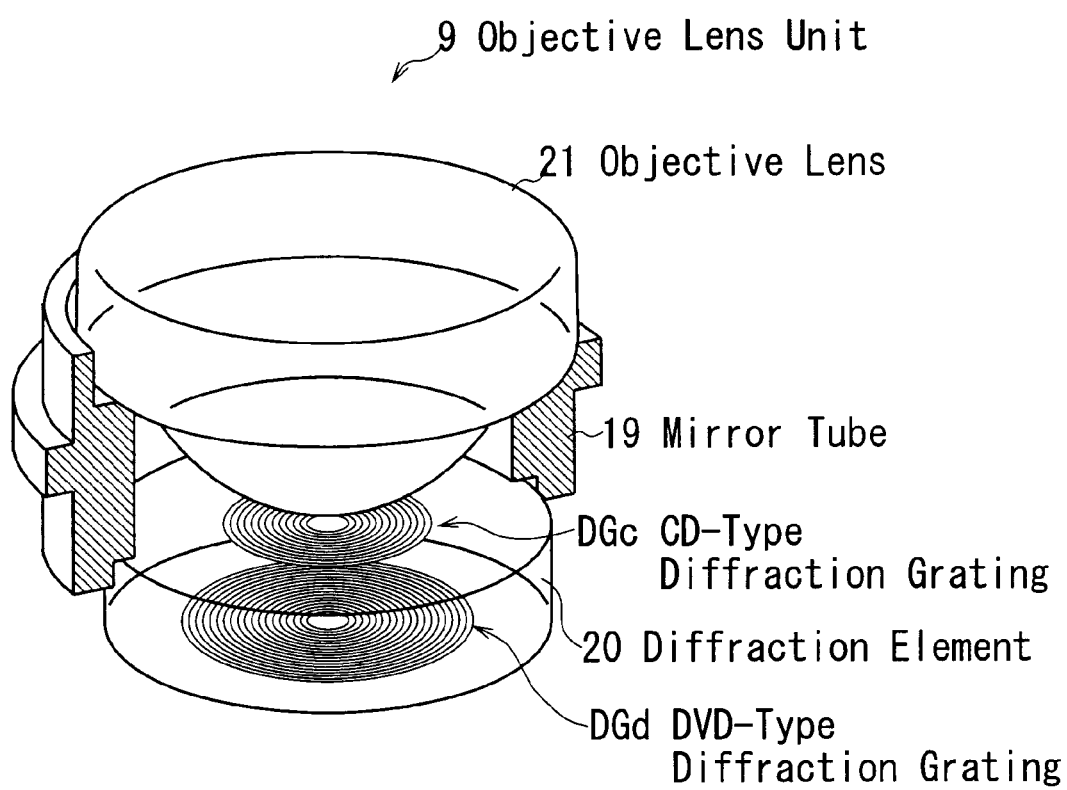
FIG. 3 is a schematic diagram illustrating the configuration of an objective lens unit.

As shown in FIG. 3 where a part of the cutting surface of the objective lens unit 9 is illustrated, a plane disc-shaped diffraction element 20 is attached to the bottom of a mirror tube 19. The objective lens 21 is placed between the top and middle areas of the mirror tube 19; the objective lens 21 includes a disc-shaped section whose size is almost the same as the diffraction element 20 and a smaller-diameter spindle-shaped section which is formed on the under surface of the disc-shaped section.

The objective lens unit 9 transforms the collimated optical beam from the quarter wavelength plate 18 into convergent light through the diffraction element 20 and the objective lens 21 to bring it to a focal point on the optical disc 100.

In the optical pickup 7, the optical beam diverged on the signal recording surface of the optical disc 100 is collimated through the objective lens 21 and diffraction element 20 of the objective lens unit 9. The optical beam is then transformed from circularly polarized light to linearly polarized light through the quarter wavelength plate 18. The optical beam then travels in the horizontal direction to the polarization beam splitter 15 after being reflected on the raise mirror 17. Before getting into the polarization beam splitter 15, the optical beam is transformed from collimated light to convergent light through the collimator lens 16.

In this case, the optical beam with particular polarization angles is reflected on the polarization layer 15A of the polarization beam splitter 15. After that, the optical beam gets into a conversion lens 22.

The conversion lens 22 changes the optical magnification of the CD-type optical beam Lc, the DVD-type optical beam Ld and the BD-type optical beam Lb. A optical axis synthesis element 23 makes the optical axes of the CD-type optical beam Lc and DVD-type optical beam Ld from the laser diode 11 and that of the BD-type optical beam Lb from the laser diode 12 all together.

On the surface of a photodetector 24 that is designed to receive the optical beam from the optical axis synthesis element 23 via the conversion lens 22, a plurality of detection cells in a predetermined shape is formed. The detection cells detect the optical beam and then photoelectric-convert it. The detection cells subsequently supply resultant detection signals to the signal processing section 4 (FIG. 1).

The signal processing section 4 performs a predetermined calculation process and other processes using the detection signals from the photodetector 24 (FIG. 2) to obtain reproduction RF signals, and then performs, based on the reproduction RF signals, predetermined decoding and demodulation processes and the like to produce reproduction signals.

In addition, the signal processing section 4 (FIG. 1) performs, using the detection signals from the photodetector 24 (FIG. 2), a predetermined calculation process and other processes to produce drive control signals such as trucking error signals and focus error signals, and then supplies the drive control signals to the control section 2. As a result, the control section 2 performs, through the drive section 3, control processes such as trucking and focus control to adjust the optical beam to have the optical beam focused on the target track of the optical disc 100. In this manner, the reproduction signals are appropriately produced.

(1-2-1) CD-Type Optical Disc

When the control section 2 (FIG. 1) determines, based on a predetermined disc type determination method, that the optical disc 100 is CD-type (100c), the control section 2 controls the laser diode 11 of the optical pickup 7 (FIG. 2) to emit the CD-type optical beam Lc, or divergent light, from the light emitting point 11A to the beam splitter 14 via the coupling lens 13.

The CD-type optical beam Lc is reflected on the reflection-transmission layer 14A of the beam splitter 14, and then passes through the polarization beam splitter 15. The CD-type optical beam Lc is subsequently collimated by the collimator lens 16, and then reflected on the raise mirror 17 to travel in the vertical direction. The CD-type optical beam Lc is subsequently converted by the quarter wavelength plate 18 from linearly polarized light into circularly polarized light, and then reaches the objective lens unit 9.

The objective lens unit 9 converts, through the diffraction element 20 and the objective lens 21, the CD-type optical beam Lc from the quarter wavelength plate 18 into convergent light, and leads it to the focus point on the signal recording surface of the CD-type optical disc 100c.

The objective lens unit 9 subsequently collimates, through the objective lens 21 and the diffraction element 20, the divergent CD-type optical beam Lc which is the reflection from the signal recording surface of the CD-type optical disc 100c, and then leads it to the quarter wavelength plate 18.

After that, in the optical pickup 7, the CD-type optical beam Lc is converted by the quarter wavelength plate 18 from circularly polarized light to linearly polarized light, and then is reflected on the raise mirror 18 to travel in the horizontal direction. The CD-type optical beam Lc is subsequently converted by the collimator lens 16 from collimated light to convergent light, and then reflected on the polarization layer 15A of the polarization beam splitter 15. After that, the CD-type optical beam Lc passes through the conversion lens 22 and the optical axis synthesis element 23 to reach the photodetector 24.

The detection cells of the photodetector 24 detect the CD-type optical beam Lc, and transmit the resultant detection signals to the signal processing section 4 (FIG. 1).

The signal processing section 4 produces, based on the detection signals, the reproduction RF signals, and then generates, based on the reproduction RF signals, the reproduction signals. On the other hand, the signal processing section 4 produces the drive control signals such as trucking error signals and focus error signals.

(1-2-2) DVD-Type Optical Disc

When the control section 2 (FIG. 1) determines, based on a predetermined disc type determination method, that the optical disc 100 is DVD-type (100d), the control section 2 controls the laser diode 11 of the optical pickup 7 (FIG. 2) to emit the DVD-type optical beam Ld, or divergent light, from the light emitting point 11B to the beam splitter 14 via the coupling lens 13.

In a similar way to that of the CD-type optical disc 100c, the DVD-type optical beam Ld is reflected on or passes through the following components: the coupling lens 13, the beam splitter 14, the polarization beam splitter 15, the collimator lens 16, the raise mirror 17 and the quarter wavelength plate 18. After that, the DVD-type optical beam Ld is converted into convergent light through the diffraction element 20 and objective lens 21 of the objective lens unit 9, and then is focused on the signal recording surface of the DVD-type optical disc 100d.

After that, in a similar way to that of the CD-type optical disc 100c, the objective lens 21 and diffraction element 20 of the objective lens unit 9 collimate the divergent DVD-type optical beam Ld, which is the reflection from the signal recording surface of the DVD-type optical disc 100d. The DVD-type optical beam Ld is subsequently reflected on or passes through the following components: the quarter wavelength plate 18, the raise mirror 17, the collimator lens 16, the polarization beam splitter 15, the conversion lens 22 and the optical axis synthesis element 23. As a result, the DVD-type optical beam Ld reaches the photodetector 24.

In a similar way to that of the CD-type optical disc 100c, the detection cells of the photodetector 24 detect the DVD-type optical beam Ld, and transmit the resultant detection signals to the signal processing section 4 (FIG. 1).

The signal processing section 4 produces, based on the detection signals, the reproduction RF signals, and then generates, based on the reproduction RF signals, the reproduction signals. On the other hand, the signal processing section 4 produces the drive control signals such as trucking error signals and focus error signals.

(1-2-3) BD-Type Optical Disc

When the control section 2 (FIG. 1) determines, based on a predetermined disc type determination method, that the optical disc 100 is BD-type (100b), the control section 2 controls the laser diode 12 of the optical pickup 7 (FIG. 2) to emit the BD-type optical beam Lb, or divergent light, from the light emitting point 12A to the beam splitter 14.

In this case, the BD-type optical beam Lb passes through the reflection-transmission layer 14A of the beam splitter 14, and goes into the polarization beam splitter 15.

After that, in a similar way to that of the CD-type optical disc 100c, the BD-type optical beam Lb is reflected on or passes through the following components: the polarization beam splitter 15, the collimator lens 16, the raise mirror 17 and the quarter wavelength plate 18. After that, the BD-type optical beam Lb is converted into convergent light through the objective lens 21 of the objective lens unit 9, and then is focused on the signal recording surface of the BD-type optical disc 100b.

By the way, in this case, the objective lens unit 9 allows the BD-type optical beam Lb to pass through the diffraction element 20. It means that the diffraction element 20 does not diffract the BD-type optical beam Lb (described later).

After that, in a similar way to that of the CD-type optical disc 100c, the objective lens 21 of the objective lens unit 9 collimates the divergent BD-type optical beam Lb, which is the reflection from the signal recording surface of the BD-type optical disc 100b. The BD-type optical beam Lb is subsequently reflected on or passes through the following components: the quarter wavelength plate 18, the raise mirror 17, the collimator lens 16, the polarization beam splitter 15, the conversion lens 22 and the optical axis synthesis element 23. As a result, the BD-type optical beam Lb reaches the photodetector 24.

In a similar way to that of the CD-type optical disc 100c, the detection cells of the photodetector 24 detect the BD-type optical beam Lb, and transmit the resultant detection signals to the signal processing section 4 (FIG. 1).

The signal processing section 4 produces, based on the detection signals, the reproduction RF signals, and then generates, based on the reproduction RF signals, the reproduction signals. On the other hand, the signal processing section 4 produces the drive control signals such as trucking error signals and focus error signals.

In this manner, the optical pickup 7 supports the CD-type optical disc 100c, the DVD-type optical disc 100d and the BD-type optical disc 100b: with the objective lens unit 9, the CD-type optical beam Lc, the DVD-type optical beam Ld and the BD-type optical beam Lb are focused on the signal recording surface of the optical disc 100 appropriately, and their reflection are correctly detected by the photodetector 24.

(1-3) Configuration of Objective Lens Unit

Figure 4:
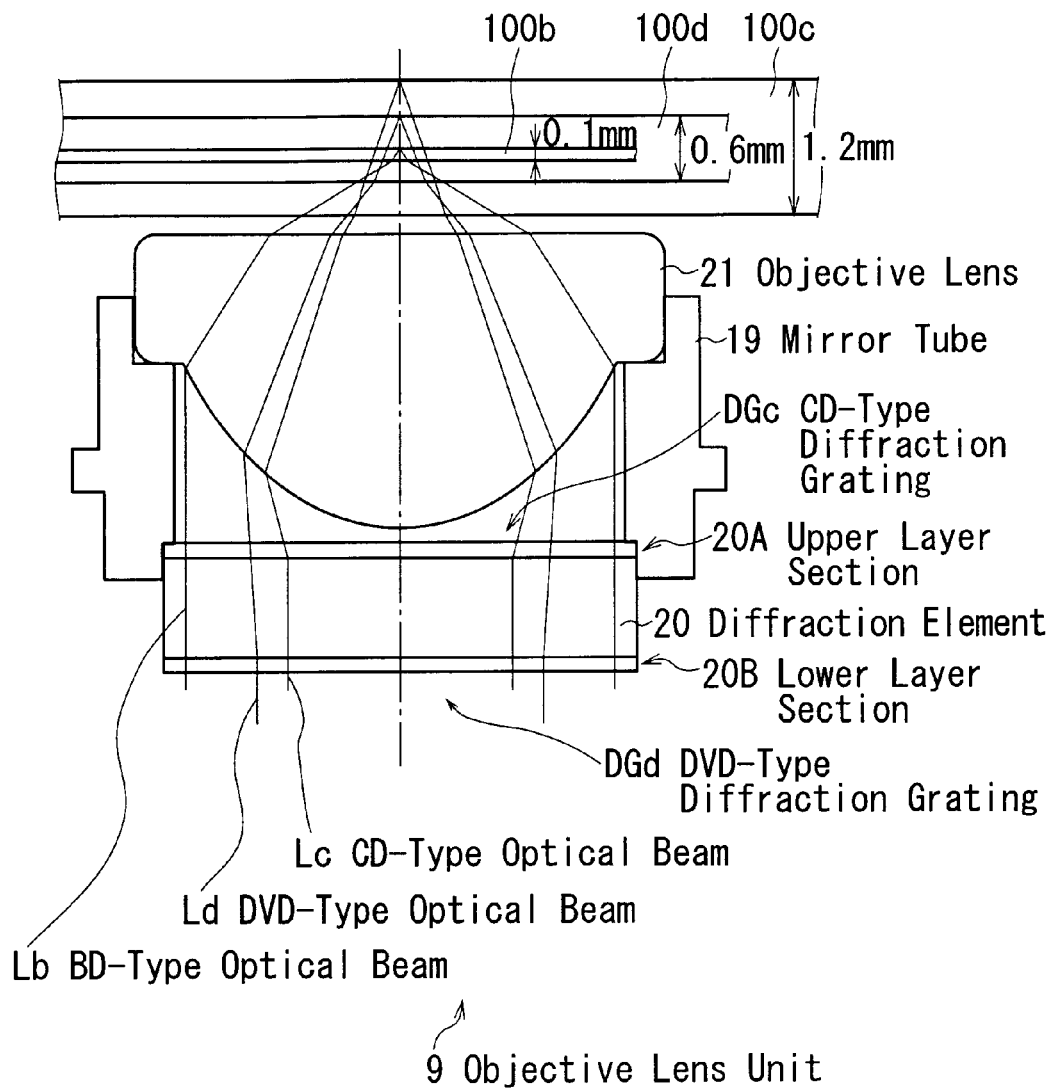
FIG. 4 is a schematic diagram illustrating light paths inside the objective lens unit.

FIG. 4 is an enlarged sectional view of the CD-type optical disc 100c, the DVD-type optical disc 100d, the BD-type optical disc 100b and the objective lens unit 9.

By the way, FIG. 4 does not illustrate the two-axis actuator 8 (FIG. 1) which is attached to the objective lens unit 9.

As for CD-, DVD- and BD-types, the following are standardized for compatibility: the wavelengths of optical beam to read out information; numerical apertures for collecting the optical beam; and the thickness of the optical discs 100 between the lower surface and the signal recording surface, or the thickness of the cover layer.

In reality, the CD-type optical disc is standardized in the following manner: the wavelength is approximately 780 nm; numerical apertures are approximately 0.45; and the thick of the cover layer is 1.2 mm. The DVD-type optical disc is standardized in the following manner: the wavelength is approximately 650 nm; numerical apertures are approximately 0.65; and the thick of the cover layer is 0.6 mm. The BD-type optical disc is standardized in the following manner: the wavelength is approximately 405 nm; numerical apertures are approximately 0.85; and the thick of the cover layer is 0.1 mm. The wavelengths $\lambda$ for CD-, DVD- and BD-types are also represented as $\lambda c$, $\lambda d$ and $\lambda b$, respectively.

In addition, as for the CD-type optical beam Lc, the DVD-type optical beam Ld and the BD-type optical beam Lb, their focal distances, the distances between the objective lens 21 and their focal points, are different due to the characteristics of the objective lens 21.

Accordingly, in the optical disc device 1, the two-axis actuator 8 (FIG. 1) adjusts the distance between the objective lens unit 9 and the optical disc 100 to have the optical beam focused on the signal recording surface of the optical discs: the two-axis actuator 8 appropriately positions the objective lens unit 9 with respect to the optical disc 100 fixed at predetermined position.

By the way, for ease of explanation, FIG. 4 illustrates the optical discs 100 whose positions are being adjusted with respect to the fixed objective lens unit 9, resulting in different distances between the objective lens 9 and each optical disc's lower surface. In addition, FIG. 4 only illustrates the cover layers of the CD-type optical disc 100c, DVD-type optical disc 100d and BD-type optical disc 100b.

Considering the relative intensity of the BD-type optical beam Lb, the numerical apertures for BD-type and the like, the objective lens 21 is mainly designed for the BD-type optical beam Lb rather than the CD-type optical beam Lc and the DVD-type optical beam Ld.

Accordingly, when the collimated BD-type optical beam Lb reaches the lower surface of the objective lens 21 of the objective lens unit 9, the objective lens 21 converts this incident BD-type optical beam Lb into convergent light to have it focused on the signal recording surface of the BD-type optical disc 100b.

However, the objective lens 21 is designed for the BD-type optical beam Lb as mentioned above: if the collimated CD-type optical beam Lc or DVD-type optical beam Ld gets into the objective lens 21 via its lower surface, it may cause an aberration while the objective lens 21 converts it into convergent light. As a result, the optical beam may not be focused on the signal recording surface of the optical disc 100 appropriately.

Accordingly, the diffraction element 20 of the objective lens unit 9 only diffracts the CD-type optical beam Lc and DVD-type optical beam Ld to supply them to the objective lens 21 as non-collimated light. On the other hand, as the collimated BD-type optical beam comes in, the diffraction element 20 supplies it to the objective lens 21 as collimated light.

As a matter of fact, on an upper layer section 20A of the diffraction element 20, a diffraction grating for CD (also referred to as "CD-type diffraction grating") DGc, or hologram, is formed to diffract only the CD-type optical beam Lc, not the DVD-type optical beam Ld and the BD-type optical beam Lb. As shown in FIG. 4, the CD-type optical beam Lc is slightly diffracted outward by the CD-type diffraction grating DGc.

That is to say, the upper layer section 20A of the diffraction element 20 allows the DVD-type optical beam Ld and the BD-type optical beam Lb to pass through it while selectively diffracting the CD-optical beam Lc. In other words, the upper layer section 20A of the diffraction element 20 is designed to only correct the aberration for the CD-type optical beam Lc.

After that, as shown in FIG. 4, the CD-type optical beam Lc from the diffraction element 20 is refracted through the lower and upper surfaces of the objective lens 21. This converts the CD-type optical beam Lc into convergent light. In this manner, the objective lens unit 9 corrects the aberration for the CD-type optical beam Lc, and leads the CD-type optical beam Lc from the objective lens 21 to a focal point on the signal recording surface of the CD-type optical disc 100c.

In addition, on a lower layer section 20B of the diffraction element 20, a diffraction grating for DVD (also referred to as "DVD-type diffraction grating") DGd, or hologram, is formed to diffract only the DVD-type optical beam Ld, not the CD-type optical beam Lc and the BD-type optical beam Lb. As shown in FIG. 4, the DVD-type optical beam Ld is slightly diffracted outward by the DVD-type diffraction grating DGd.

That is to say, the lower layer section 20B of the diffraction element 20 allows the CD-type optical beam Lc and the BD-type optical beam Lb to pass through it while selectively diffracting the DVD-optical beam Ld. In other words, the lower layer section 20B of the diffraction element 20 is designed to only correct the aberration for the DVD-type optical beam Ld.

After that, as shown in FIG. 4, the DVD-type optical beam Ld from the diffraction element 20 is refracted through the lower and upper surfaces of the objective lens 21. This converts the DVD-type optical beam Ld into convergent light. In this manner, the objective lens unit 9 corrects the aberration for the DVD-type optical beam Ld, and leads the DVD-type optical beam Ld from the objective lens 21 to a focal point on the signal recording surface of the DVD-type optical disc 100d.

In this manner, in the objective lens unit 9, the upper layer section 20A of the diffraction element 20 only corrects the aberration for the CD-type optical beam Lc by diffracting it while the lower layer section 20B of the diffraction element 20 only corrects the aberration for the DVD-type optical beam Ld by diffracting it. That can appropriately lead the CD-type optical beam Lc, the DVD-type optical beam Ld or the BD-type optical beam Lb to focal points of the signal recording surface of the CD-type optical disc 100c, the DVD-type optical disc 100d or the BD-type optical disc 100b even after they pass through the objective lens 21 designed for the BD-type optical beam Lb.

(1-4) Configuration of Diffraction Element

Figure 5A:
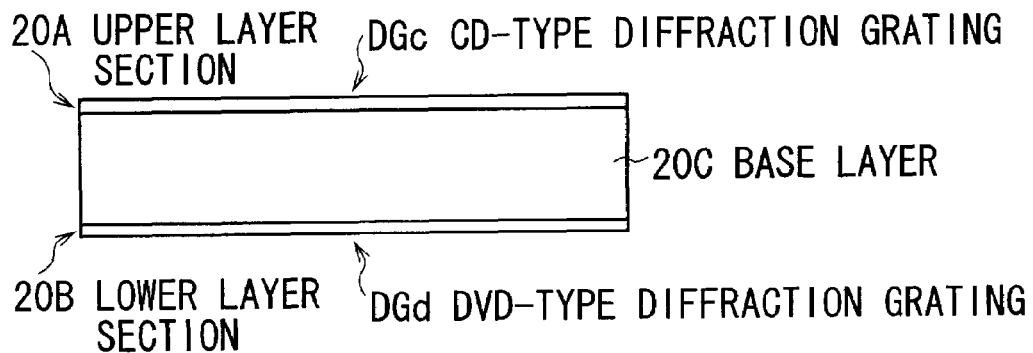
FIGS. 5A to 5C are schematic diagrams illustrating the configuration of a diffraction element.

As shown in FIG. 5A, the diffraction element 20 includes a flat, disc-shaped base layer 20C. Its upper layer section 20A includes the CD-type diffraction grating DGc while its lower layer section 20B includes the DVD-type diffraction grating DGd, as mentioned above.

The base layer 20C is for example made from transparent synthetic resin with a predetermined refractive index. Its interface to air or other materials can diffract the optical beam.

Figure 5B:
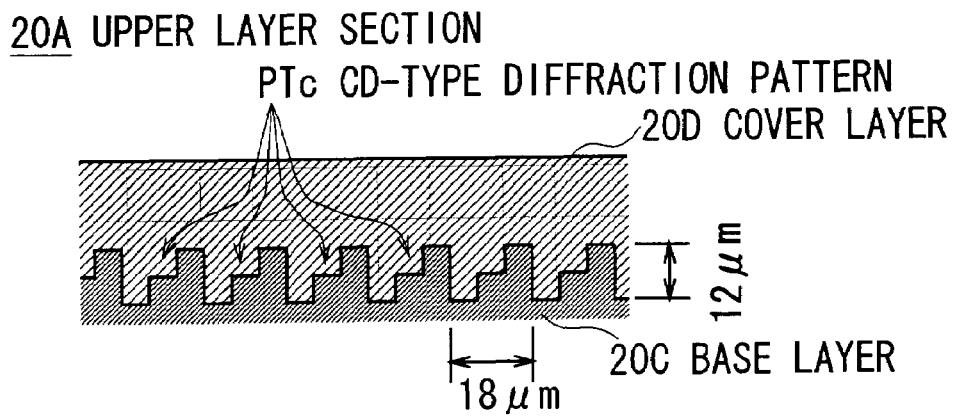

FIG. 5B is an enlarged sectional view of the upper layer section 20A. The CD-type diffraction pattern PTc is formed on an upper surface of the base layer 20C: the CD-type diffraction pattern PTc includes a plurality of step-like protruding parts located at certain intervals. The CD-type diffraction pattern PTc is covered by a cover layer 20D that is for example made from transparent resin.

The step-like CD-type diffraction pattern PTc includes three steps for each protruding part: the height of the protruding parts from bottom to top is 12 µm; and the interval of protruding parts, or the distance between one protruding part to the adjoining protruding part, is 18 µm. As shown in FIG. 3, the CD-type diffraction pattern PTc is concentrically formed on the upper surface of the diffraction element 20 within one-half radius from the center.

The cover layer 20D is made from a transparent material whose refraction index is different from that of the base layer 20C. A lower surface of the cover layer 20D is attached to the CD-type diffraction pattern PTc without no space between them. An upper surface of the cover layer 20D is substantially flat.

In this manner, the upper layer section 20A of the diffraction element 20 includes the step-like CD-type diffraction pattern PTc whose protruding portions are located at certain intervals on the upper surface of the base layer 20C. On the CD-type diffraction pattern PTc, the cover layer 20D is formed: the refraction index of the cover layer 20D is different from that of the base layer 20C. Accordingly, the upper layer section 20A diffracts the optical beam of particular wavelengths while the optical beam of other wavelengths passes through it without being diffracted. In this case, the CD-type diffraction grating DGc only diffracts the CD-type optical beam Lc.

Figure 5C:
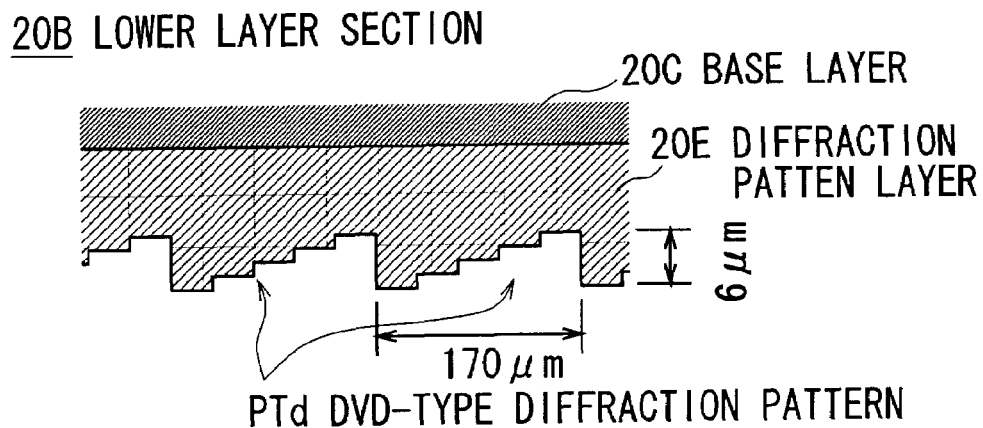

FIG. 5C is an enlarged sectional view of the lower layer section 20B. On a flat lower surface of the base layer 20C, a diffraction pattern layer 20E including a DVD-type diffraction grating DGd is formed.

The diffraction pattern layer 20E is made from a transparent resin whose refraction index is substantially the same as that of the base layer 20C. The lower surface of the diffraction pattern layer 20E has a step-like DVD-type diffraction pattern PTd whose protruding portions are located at certain intervals. The lower surface of the diffraction pattern layer 20E is an interface to air because it is not covered with any materials.

The step-like DVD-type diffraction pattern PTd includes five steps for each protruding part: the height of the protruding parts from bottom to top is 6 µm; and the interval of protruding parts, or the distance between one protruding part to the adjoining protruding part, is 170 µm. As shown in FIG. 3, the DVD-type diffraction pattern PTd is concentrically formed on the lower surface of the diffraction element 20 within two-thirds radius from the center.

In this manner, the lower layer section 20B of the diffraction element 20 includes the step-like DVD-type diffraction pattern PTd on the diffraction pattern layer 20E attached to the lower surface of the base layer 20C: the DVD-type diffraction pattern PTd includes protruding parts located at certain intervals. That diffracts particular wavelengths of optical beams while other wavelengths pass through it without being diffracted. That serves as a DVD-type diffraction grating DGd to only diffract the DVD-type optical beam Ld.

(2) Designing Diffraction Elements

Figure 6:
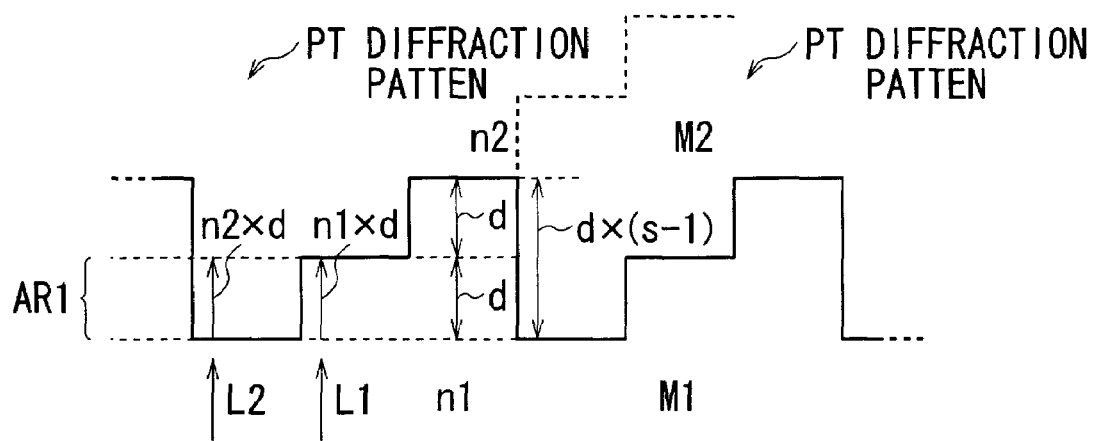
FIG. 6 is a schematic diagram illustrating light paths in the diffraction element.

The method for designing the diffraction element 20 will be described. With FIGS. 5B and 6, the following describes a condition of selecting materials for the diffraction element 20. For ease of explanation, the base and cover layers 20C and 20D in FIG. 6 are illustrated in the following manner: the base layer 20C is represented as a first layer made from a material M1; and the cover layer 20D is represented as a second layer made from a material M2. The diffraction grating DG contains the diffraction pattern PT whose step-like protruding parts are located at certain intervals in between the two layers.

In this case, the number of steps of one protruding portion of the diffraction pattern PT is represented as "s" while the height of the protruding portion is represented as "d".

In addition, the optical beam L passes through the first layer (or the material M1) and the second layer (or the material M2) in that order.

(2-1) Difference of Optical Path for One Wavelength

An optical path of a certain wavelength λ will be described. The refraction index of the material M1 for the wavelength λ is represented as "n1" while the refraction index of the material M2 for the wavelength λ is represented as "n2".

When the optical beam L1 passes through an area AR1 containing one protruding portion, it means that the optical beam L1 goes through the material M1. In this case, the length of the optical path is represented as (n1×d). When the optical beam L2 passes through an area AR1 containing one protruding portion, it means that the optical beam L2 goes through the material M2. In this case, the length of the optical path is represented as (n2×d).

As a result, the optical path difference between the optical beams L1 and L2 is represented as (n2−n1)d in the area AR1. As indicated by an equation (4) below, a phase difference φ is calculated by dividing the optical path difference (n2−n1) d by the wavelength λ and multiplying the result of the division by 2π.

$$\phi 1 = 2\pi \frac{(n2(\lambda) - n1(\lambda)) \cdot d}{\lambda} \quad (4)$$

The diffraction process of the diffraction grating DG will be described. If the phase difference φ1 of one protruding portion of the diffraction grating DG is substantially equal to the wavelength λ multiplied by the a whole number, the optical beam L with the wavelength λ will not be affected by the diffraction pattern PT. It means that the optical beam L with the wavelength λ will not be diffracted by the diffraction pattern PT. This point is represented as follows:

$$\phi 1 = 2\pi \cdot p \quad (5)$$

where "p" is any whole number. The fact that "the diffraction grating DG does not diffract the wavelength λ because of satisfying the equations (4)-(5)" is also referred to as "this is zero-order type about the wavelength λ".

By contrast, when the optical beam L with the wavelength λ is diffracted by the diffraction grating DG, the above equation (5) is not satisfied. To maximize the diffraction efficiency of the diffraction grating DG, the adjacent phases may need to be smoothly connected with one another between the adjacent protruding portions of the diffraction pattern PT, resulting in no difference between the phases.

In other words, if there are more steps (more than s steps) at one protruding portion as indicated by the dotted lines in FIG. 6, the phase difference φ1 for the s steps may need to be equal to the wavelength λ multiplied by a whole number. This point is represented as follows:

$$\phi s = 2\pi \frac{s \cdot (n2(\lambda) - n1(\lambda)) \cdot d}{\lambda} \quad (6)$$

$$\phi s = 2\pi \cdot q \quad (7)$$

where "q" is any whole number. If the whole number q can be divided by the number of steps s, the optical beam L with the wavelength λ may not be diffracted because the phase difference φ for one step of the protruding portion is substantially equal to the wavelength λ multiplied by a whole number. Accordingly, in order to have the wavelength λ of the optical beam L diffracted at the diffraction grating DG, "s" (or the number of steps) and "q" may need to be prime to each other. This point is represented as follows:

$$gcd(s,q) = 1 \quad (8)$$

In this case, gcd(a,b) for example represents the greatest common divisor of an integer "a" and an integer "b".

The fact that "the diffraction grating DG diffracts the wavelength λ because of satisfying the equations (6)-(8)" is also referred to as "this is first-order type about the wavelength λ".

Accordingly, the following is evident within the area including one protruding portion of the diffraction pattern PT: Considering path differences of the wavelength λ of the optical beam L passing through the diffraction pattern PT, the equations (4)-(5) are satisfied to be the zero-order type while the equations (6)-(8) are satisfied to be the first-order type.

By the way, as the number of steps "s" of the first-order type diffraction grating DG rises, the diffraction pattern PT as a whole will be close to the shape of a right triangle, or the shape of a brazed hologram. This increases the diffraction efficiency.

On the other hand, increasing the integer "p" or "q" in the above equations (4)-(5) or (6)-(8) lowers the efficiency due to diffraction around vertical surfaces of the protruding portions of the diffraction pattern PT, slight bumps on the vertical surfaces of the protruding portions and the like.

Accordingly, it is desirable that the integers "p" and "q" satisfy the following conditions:

$$p \leq 5,$$
$$\frac{q}{s} \leq 5 \quad (9)$$

By the way, if the phase difference φ1 for one step of the protruding portion (the equations (4)-(5)) becomes different from "2π×a whole number" as indicated as "φ1=(2π×(p+ε))" (wherein ε is less than one, indicating a difference), or if the phase difference φs for "s" steps of the protruding portion (the equations (6)-(7)) becomes different from "2π×a whole number" as indicated as "φs=(2π×(q+ε))", that lowers the transmission or diffraction efficiency.

The amount of lowering of the efficiency T (or the degree of efficiency reduction) is calculated as follows:

$$T(\epsilon) \approx T0 \cos(\epsilon(s-1)2\pi)^2 \quad (10)$$

where T(ε) represents the amount of lowering of the efficiency, and T(0) represents the efficiency when the difference ε does not occur. In order to keep the amount of lowering T(ε) below 20%, the following condition may need to be satisfied:

$$|\varepsilon| < \frac{0.2}{s-1} \quad (11)$$

Satisfying the equation (9) about the integers "p" and "q" and the equation (11) about the difference ε contributes to the increase of the transmission and diffraction efficiencies.

(2-2) Optical Path Difference for a Plurality of Wavelengths

The optical path difference for a plurality of wavelengths λ on the diffraction grating DG will be described: the wavelengths include the CD-type wavelength λc, the DVD-type wavelength λd and the BD-type wavelength λb.

The following describes whether the wavelengths λ should be diffracted at the diffraction grating DG i.e., whether the zero-order type or the first-order type.

On the basis that the diffraction gratings DG can be formed on the upper layer section 20A and the lower layer section 20B of the diffraction element 20 (FIG. 5A), assume that both an upper layer diffraction grating DGx and a lower layer diffraction grating DGy may be formed. Also this is designed on the basis that the objective lens 21 is designed to be suitable for the BD-type optical beam Lb, and the CD-type optical beam Lc is stronger than the BD-type optical beam Lb.

In this case, as shown in FIGS. 7A and 7B, there are two types of combination: a first combination (FIG. 7A) in which the both diffraction gratings DGx and DGy do not diffract the BD-type wavelength λb while the DVD- and CD-type wavelengths λd and λc are diffracted by the lower layer and upper layer diffraction gratings DGy and DGx, respectively; and a second combination (FIG. 7B) in which the both diffraction gratings DGx and DGy do not diffract the BD-type wavelength λb, and the DVD-type wavelength λd is diffracted by the lower layer diffraction grating DGy while the CD-type wavelength λc is diffracted by both the upper layer and lower layer diffraction gratings DGx and DGy.

That means that there are two possible choices to the diffraction grating DG as shown in FIG. 7C: a first diffraction grating DG1 that only diffracts the wavelength λc while the wavelengths λb and λd are not diffracted; and a second diffraction grating DG2 that diffracts the wavelengths λd and λc while the wavelength λb is not diffracted.

Since the same calculation method can be used for both the diffraction grating that only diffracts the wavelength λd and the diffraction grating that only diffracts the wavelength λc, the first diffraction grating DG1 will be described as one that only diffracts the wavelength λc for ease of explanation.

Figure 8:
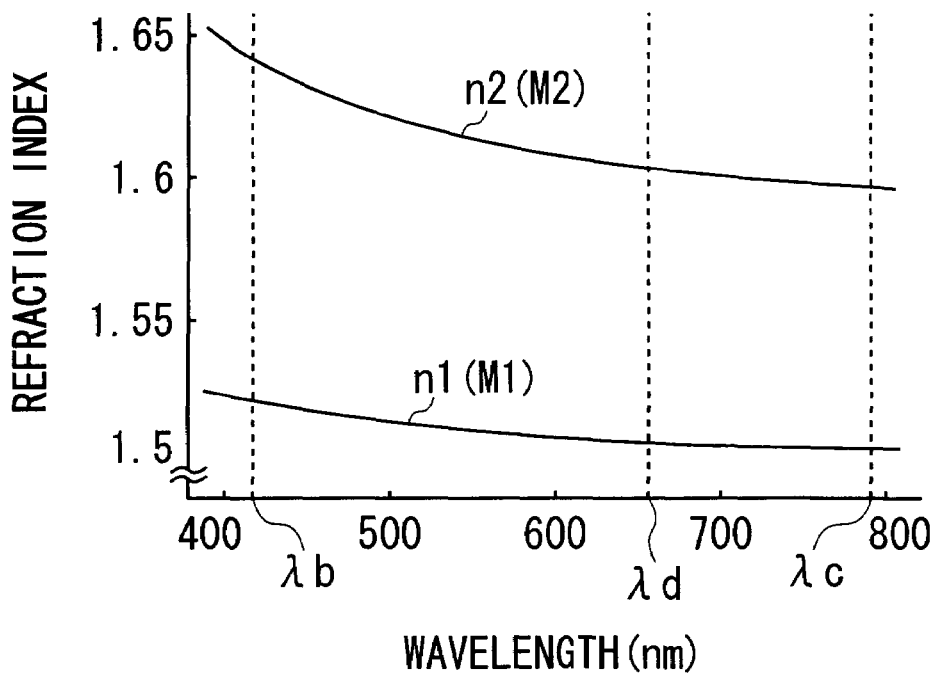
FIG. 8 is a schematic diagram illustrating refraction indexes of materials with wavelengths.
Figure 9:
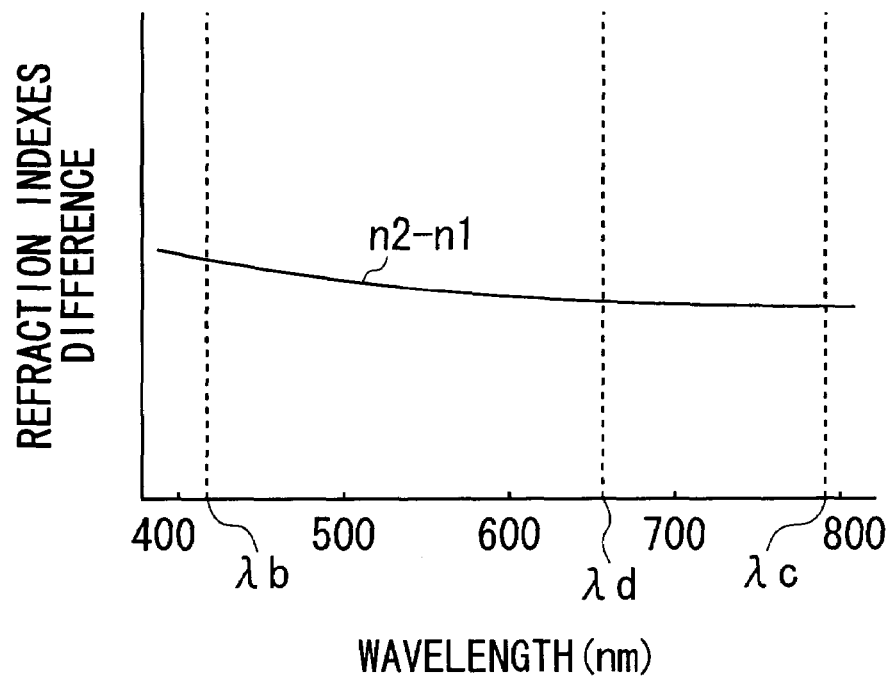
FIG. 9 is a schematic diagram illustrating refraction indexes difference with wavelengths.

By the way, the materials M1 and M2, from which the diffraction grating DG are made, are similar to general materials which the optical beam L passes through, as shown in FIG. 8. This means that their diffraction index n1 and n2 vary according to wavelengths λ, causing dispersion. In addition, the refraction index n1 changes with wavelengths in a different manner from the refraction index n2. As shown in FIG. 9, the difference between these refraction indexes also varies according to wavelengths i.e., having dispersion.

Accordingly, the following values are different from each other: the refraction indexes difference for the BD-type wavelength λb or (n2(λb)−n1(λb)); the refraction indexes difference for the DVD-type wavelength λd or (n2(λd)−n1(λd)); and the refraction indexes difference for the CD-type wavelength λc or (n2(λc)−n1(λc)).

That means that, when designing the diffraction grating that supports a plurality of wavelengths λ, the fact that the refraction indexes vary according to wavelengths λ may need to be considered.

(2-2-1) First Diffraction Grating

The following describes the first diffraction grating DG1 (FIG. 7C) that only diffracts the CD-type wavelength λc, not the BD- and DVD-type wavelengths λb and λd. The diffraction grating DG1 satisfies the following condition to only diffract the CD-type wavelength λc:

$$2\pi \frac{(n2(\lambda b) - n1(\lambda b)) \cdot d}{\lambda b} = 2\pi \cdot pb \quad (12)$$
$$2\pi \frac{(n2(\lambda d) - n1(\lambda d)) \cdot d}{\lambda d} = 2\pi \cdot pd$$
$$2\pi \frac{s \cdot (n2(\lambda c) - n1(\lambda c)) \cdot d}{\lambda c} = 2\pi \cdot qc$$

This condition (12) is based on the above equations (4)-(7). Each side of the above equation (12) is then divided by 2π to obtain the ratio as follows:

$$\frac{(n2(\lambda b) - n1(\lambda b)) \cdot d}{\lambda b} : \quad (13)$$
$$\frac{(n2(\lambda d) - n1(\lambda d)) \cdot d}{\lambda d} : \frac{s \cdot (n2(\lambda c) - n1(\lambda c)) \cdot d}{\lambda c} = pb : pd : qc$$

Each term in the left side of the above equation (13) is then multiplied by λb/d to obtain the following equation (14):

$$(n2(\lambda b) - n1(\lambda b)) : (n2(\lambda d) - n1(\lambda d))\frac{\lambda b}{\lambda d} : s \cdot (n2(\lambda c) - n1(\lambda c))\frac{\lambda b}{\lambda c} = \quad (14)$$
$$pb : pd : qc$$

In this case, as shown in an equation (15) below, the refraction indexes differences are represented as δb, δd and δc while the ratio of wavelengths are represented as ρbd and ρbc: They replace each term in the left side of the equation (14). Considering that each term in the right side of the equation (14) includes εb, εd or εc which indicates the difference from integers, the equation (14) can be transformed into the following equation (16).

$$\delta b = (n2(\lambda b) - n1(\lambda b)) \quad (15)$$
$$\delta d = (n2(\lambda d) - n1(\lambda d))$$
$$\delta c = (n2(\lambda c) - n1(\lambda c))$$
$$\rho bd = \frac{\lambda b}{\lambda d}$$
$$\rho bc = \frac{\lambda b}{\lambda c}$$
$$\delta b : \delta d \cdot \rho bd : s \cdot \delta c \cdot \rho bc = pb + \varepsilon b : pd + \varepsilon d : qc + \varepsilon c \quad (16)$$

Each term in the equation (16) includes the following except the height d of the steps: the wavelengths λ; the refraction indexes n of materials M for each wavelength λ; the number of steps s; the integers p and q; and the differences from integers ε. This means that the equation (16) is not associated with the height d.

In addition, replacing the integer q of the equation (8) with other integer qc presents a condition that "the integer qc, which is based on the diffraction-target wavelength λc, is prime to s or the number of steps" as follows:

$$gcd(s, qc) = 1 \tag{17}$$

When the equations (16), (17) and (11) are satisfied, the diffraction grating DG only diffracts the wavelength λc, not the wavelengths λb and λd. The materials M1 and M2 are therefore selected such that their refraction indexes satisfy the equations (16), (17) and (11).

(2-2-2) Second Diffraction Grating

The following describes the second diffraction grating DG2 (FIG. 7C) that diffracts the DVD- and CD-type wavelength λd and λc, not the BD-type wavelengths λb. The diffraction grating DG2 satisfies the following condition, which is slightly different from that of the first diffraction grating, to diffract the DVD- and CD-type wavelength λd and λc:

$$2\pi \frac{(n2(\lambda b) - n1(\lambda b)) \cdot d}{\lambda b} = 2\pi \cdot pb \tag{18}$$
$$2\pi \frac{s \cdot (n2(\lambda d) - n1(\lambda d)) \cdot d}{\lambda d} = 2\pi \cdot qd$$
$$2\pi \frac{s \cdot (n2(\lambda c) - n1(\lambda c)) \cdot d}{\lambda c} = 2\pi \cdot qc$$

This condition (18) is based on the above equations (4)-(7). In a similar way to that of the first diffraction grating, each side of the above equation (18) is divided by $2\pi$ to obtain the ratio, and each term in the left side of the resultant equation is then multiplied by λb/d to obtain the following equation (19):

$$(n2(\lambda b) - n1(\lambda b)) : s \cdot (n2(\lambda d) - n1(\lambda d)) \frac{\lambda b}{\lambda d} : s \cdot (n2(\lambda c) - n1(\lambda c)) \frac{\lambda b}{\lambda c} = \tag{19}$$
$$pb : qd : qc$$

The terms of the equation (15) replace terms in the left side of the equation (19). Considering that each term in the right side of the equation (19) includes εb, εd or εc which indicates the difference from integers, the equation (19) can be transformed into the following equation (20):

$$\delta b : s \cdot \delta d \cdot pbd : s \cdot \delta c \cdot pbc = pb + \epsilon b : qd + \epsilon d : qc + \epsilon c \tag{20}$$

Replacing the integer q of the equation (8) with other integer qd or qc presents a condition that "the integer qd, which is based on the diffraction-target wavelength λd, is prime to s or the number of steps" and a condition that "the integer qc, which is based on the diffraction-target wavelength λc, is prime to s or the number of steps" as follows:

$$gcd(s, qd) = 1,$$
$$gcd(s, qc) = 1 \tag{21}$$

Each term in the equation (20) does not include the height d of the steps: the equation (20) is not associated with the height d.

When the equations (20), (21) and (11) are satisfied, the diffraction grating DG diffracts the wavelengths λd and λc, not the wavelengths λb. The materials M1 and M2 are therefore selected such that their refraction indexes satisfy the equations (20), (21) and (11).

(2-3) Examples of Designing Diffraction Gratings

An example of designing the diffraction grating DG (FIG. 6) will be described. In this case, the diffraction grating DG to be designed is similar to the above first diffraction grating that only diffracts the CD-type wavelength λc, not the BD- and DVD-type wavelengths λb and λd.

In this case, the design condition is for example defined as follows: the diffraction pattern has three steps for each protruding part, the BD-type wavelength λb is 408 nm, the DVD-type wavelength λd is 655 nm, and the CD-type wavelength λc is 785 nm.

In this manner, the number of steps s is set at a prime number or three. This is because it is easy to satisfy the equation (17).

Using the above design condition, the refraction indexes of materials are applied to the left side of the equation (16), and it is checked that whether or not the equation (17) is satisfied. In addition, the following equations are also checked: whether the equation (11) is satisfied or not with the differences from integers εb, εd and εc i.e., whether or not the ratio of the left side of the equation (16) can be substantially expressed by integers.

Figures 10, 11:
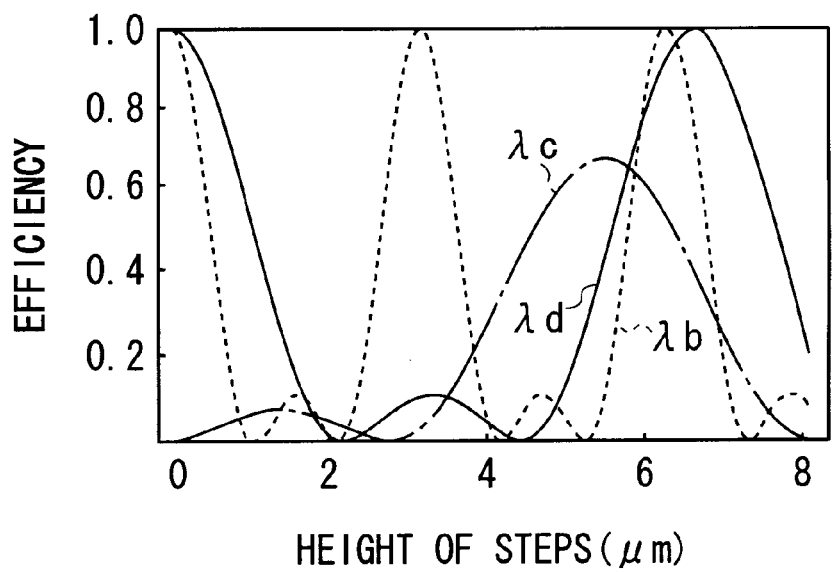
FIG. 10 is a schematic diagram illustrating refraction indexes of resin with wavelengths.
FIG. 11 is a schematic diagram illustrating efficiencies to the height of steps.

When the materials M1 and M2 are, respectively, polyolefin resin and acrylic ultraviolet curable resin that have the refraction indexes as shown in FIG. 10, the following equation (22) is obtained as a result of substituting these refraction indexes for the corresponding parts of the equation (16):

$$\delta b : \delta d \cdot pbd : s \cdot \delta c \cdot pbc = 4 + 0.159 : 2 + 0.008 : 5 + (-0.095) \tag{22}$$

In addition, the following equation (23) is obtained as a result of substituting each value for the corresponding parts of the equation (17):

$$gcd(3, 5) = 1 \tag{23}$$

It is evident from the equations (22) and (23) that both the equations (17) and (11) are satisfied. The attainment of the goal means the diffraction grating DG only diffracting the CD-type wavelength λc without diffraction of the BD- and DVD wavelengths λb and λd.

FIG. 11 shows the result of calculating diffraction efficiencies on the diffraction grating DG in which the height of the step is represented as "d": Based on the result, the "d" is set at 6.53 μm to increase the diffraction efficiencies for all the wavelengths λb, λd and λc.

In this manner, the design of the diffraction grating DG includes the process of: substituting the refraction indexes of materials for the corresponding parts of the left side of the equation (16); and finding a condition that satisfies the equation (17) and the equation (11) regarding the differences from integers εb, εd and εc. This allows designing the diffraction grating DG that only diffracts certain wavelengths.

By the way, the interval of the protruding portions of the diffraction pattern PT is determined by performing a predetermined calculation based on the distance from the diffraction element 20 to the objective lens 21 (FIG. 4), the target diffraction angles of the optical beam L and the like.

(3) Operation and Effect

To design the diffraction grating DG that only diffracts the CD-type wavelength λc without any diffraction of the BD- and DVD-type wavelengths λb and λd, the refraction indexes n of possible materials M1 and M2 for each wavelength λ are applied to the left side of the equation (16).

The desired diffraction grating DG is attained when the right side of the equation (16) is simply expressed by integers and the equation (17) is satisfied. In sum, the materials M1 and M2 are suitable for the diffraction grating DG.

Using the equations (16), (17) and (11), it is easily checked whether the materials M1 and M2 are suitable for the diffraction grating DG. This allows easy selection of materials M1 and M2 to build the target diffraction grating DG.

In addition, when the equation (11) is satisfied, the diffraction and transmission efficiencies for each wavelength λ of the optical beam are maintained.

Moreover, the height of step d is not specified in the equation (16). This allows selection of the materials M1 and M2 before planning the dimension of the diffraction pattern PT. After selecting the materials M1 and M2 the height of step d is properly determined based on the refraction indexes n1 and n2 of the materials M1 and M2 and the like.

Abbe number, a measure used for designing optical components may be applied to selection of materials M1 and M2. However, the Abbe number are not suitable for the UV curable resin: While it is a measure of dispersion of glass materials and the like, the Abbe number does not work well for abnormal dispersion of the UV curable resin.

On the other hand, the equation (16) works well for abnormal dispersion of the UV curable resin because it uses the real refraction indexes n of materials M1 and M2 regarding diffracted and non-diffracted wavelengths λ. This allows designing the diffraction grating DG despite the abnormal dispersion.

The above configuration makes this possible: To design the diffraction grating DG that only diffracts a certain wavelength λ, the refraction indexes n of possible materials M1 and M2 for each wavelength λ are applied to the left side of the equation (16); and, if the equation (11) is satisfied to express the right side of the equation (16) in a simple integer ratio and the equation (17) is satisfied at the same time, the materials M1 and M2 are determined as suitable for the diffraction grating DG. This allows easy selection of the materials M1 and M2 for the desired diffraction grating DG.

(4) Other Embodiments

In the above-noted embodiments, the diffraction grating DG is designed to only diffract the CD-type wavelength λ without any diffraction of the BD- and DVD-type wavelengths λb and λd. However the present invention is not limited to this. The diffraction grating DG may be designed to diffract other wavelengths, such as diffracting only the DVD-type wavelength λd without diffracting the BD- and CD-type wavelengths λb and λc.

In the above-noted embodiments, the diffraction grating DG includes the materials M1 and M2 attached to one another. However the present invention is not limited to this. The diffraction grating DG may not include the material M2.

In this case, the air surrounding the material M1 may be regarded as the material M2 whose refraction index n is "1": For example, when designing the DVD-type diffraction grating DGd on the lower layer section 20B of the diffraction element 20 (FIG. 5A), the equation (16) is defined on the basis that only the wavelength λd is diffracted. In addition, the refraction index n2 of the material M2 is set at "1".

Furthermore, in the above-noted embodiments, the BD-type wavelength of 408 nm, the DVD-type wavelength of 655 nm and the CD-type wavelength of 785 nm are applied. However the present invention is not limited to this. It may include other wavelengths or other formats.

Furthermore, in the above-noted embodiments, after selecting the wavelengths to be diffracted out of three types of wavelengths (BD-, DVD and CD-types), the materials M1 and M2 are selected based on the equations (16) and (20). However the present invention is not limited to this. For example, after selecting the wavelengths to be diffracted out of four types of wavelengths, the materials M1 and M2 may be selected based on the equations (12)-(16) or the transformed equations (17)-(20).

Furthermore, in the above-noted embodiments, the amount of lowering of the efficiency T, or T(ε), is maintained below about 20%. However the present invention is not limited to this. The amount of lowering T(ε) may be maintained below 10 or 15%. In addition, instead of the equation (11), ε is defined in other ways such as ε<0.1.

Furthermore, in the above-noted embodiments, the CD-type diffraction grating DGc of the upper layer section 20A of the diffraction element 20 (FIG. 5A) only diffracts the CD-type wavelength λc while the DVD-type diffraction grating DGd of the lower layer section 20B only diffracts the DVD-type wavelength λd. However the present invention is not limited to this. For example, the diffraction grating DG of the lower layer section 20B may only diffract the CD-type wavelength λc while the diffraction grating DG of the upper layer section 20A may diffract the DVD- and CD-type wavelengths λd and λc. Other combinations may be applied.

Furthermore, in the above-noted embodiments, the diffraction element 20 incorporated in the objective lens unit 9 of the optical pickup 7 of the optical disc device 1 is designed by the above method. However the present invention is not limited to this. The diffraction element 20, the objective lens unit 9 or the optical pickup 7 may be incorporated in other devices.

The diffraction element, objective lens unit, optical pickup, optical disc apparatus and design method for diffraction elements can be applied to other optical devices that support a plurality of wavelengths of optical beams.

It should be understood by those skilled in the art that various modifications, combinations, sub-combinations and alterations may occur depending on design requirements and other factors insofar as they are within the scope of the appended claims or the equivalents thereof.

What is claimed is:

1. A design method for designing a diffraction element including a first and second layer attached to one another and a diffraction pattern in which each of step-like protruding portions located at predetermined intervals between the first and second layers includes s steps wherein the first and second layers are respectively made from a first and second material through which a first, second and third wavelength λ1, λ2 and λ3 of an optical beam passes, the design method comprising a selection step of selecting the first material and the second material such that the first material's refraction indexes n1(λ1), n1(λ2) and n1(λ3) for the first, second and third wavelengths λ1, λ2 and λ3 and the second material's refraction indexes n2(λ1), n2(λ2) and n2(λ3) for the first, second and third wavelengths λ1, λ2 and λ3 satisfy one of the following conditions (1) or (2):

$$\delta 1 : \delta 2 \cdot \rho 12 : s \cdot \delta 3 \cdot \rho 13 = p1 + \epsilon 1 : p2 + \epsilon 2 : q3 + \epsilon 3; \text{ and}$$

$$\gcd(s, q3) = 1 \quad (1)$$

wherein i=1,2,3 j=1,2,3 and i≠j;

δi=n2(λi)−n1(λi);

"ρij" represents a ratio of wavelengths or $$\rho ij = \frac{\lambda j}{\lambda i};$$

"p1", "p2" and "q3" represents any whole numbers;
"ϵi" represents a difference from whole numbers or $$\varepsilon i < \frac{0.2}{s-1};$$

and

"gcd(a,b)" represents the greatest common divisor of whole numbers a and b or

δ1:s·δ2·ρ12:s·δ3·ρ13=p1+ϵ1: q2+ϵ2: q3+ϵ3;

gcd(s,q2)=1; and gcd(s,q3)=1   (2)

wherein "q2" represents any whole numbers.

2. The design method according to claim 1, wherein the number of steps s, and the whole numbers pi and qj satisfy the following equation (3):

$$pi \leq 5 \quad (3)$$
$$\frac{qj}{s} \leq 5.$$

3. The design method according to claim 1, wherein at least either the first material or the second material is made from resin.

4. A diffraction element including:
a first and second layer attached to one another; and
a diffraction pattern in which each of step-like protruding portions located at predetermined intervals between the first and second layers includes s steps, wherein:
the first layer and second layer are respectively made from a first and second material through which a first, second and third wavelength λ1, λ2 and λ3 of an optical beam passes; and
the first material and the second material are selected such that the first material's refraction indexes n1(λ1), n1(λ2) and n1(λ3) for the first, second and third wavelengths λ1, λ2 and λ3 and the second material's refraction indexes n2(λ1), n2(λ2) and n2(λ3) for the first, second and third wavelengths λ1, λ2 and λ3 satisfy one of the following conditions (1) or (2):

δ1:δ2·ρ12:s·δ3·ρ13=p1+ϵ1:p2+ϵ2:q3+ϵ3; and gcd(s,q3)=1   (1)

wherein
i=1,2,3 j=1,2,3 and i≠j;
δi=n2(λi)−n1(λi);
"ρij" represents a ratio of wavelengths or $$\rho ij = \frac{\lambda j}{\lambda i};$$

"p1", "p2" and "q3" represents any whole numbers;
"ϵi" represents a difference from whole numbers or $$\varepsilon i < \frac{0.2}{s-1};$$

and

"gcd(a,b)" represents the greatest common divisor of whole numbers a and b or

δ1:s·δ2·ρ12:s·δ3·ρ13=p1+ϵ1:q2+ϵ2:q3+ϵ3;

gcd(s,q2)=1; and gcd(s,q3)=1   (2)

wherein
"q2" represents any whole numbers.

5. An objective lens unit including:
a diffraction element including a first and second layer attached to one another and a diffraction pattern in which each of step-like protruding portions located at predetermined intervals between the first and second layers includes s steps, the first and second layers being respectively made from a first and second material through which a first, second and third wavelength λ1, λ2 and λ3 of an optical beam passes; and
an objective lens collecting the first, second or third wavelength λ1, λ2 or λ3 of the optical beam from the diffraction element, wherein
the first material and the second material are selected such that the first material's refraction indexes n1(λ1), n1(λ2) and n1(λ3) for the first, second and third wavelengths λ1, λ2 and λ3 and the second material's refraction indexes n2(λ1), n2(λ2) and n2(λ3) for the first, second and third wavelengths λ1, λ2 and λ3 satisfy one of the following conditions (1) or (2):

δ1:δ2·ρ12:s·δ3·ρ13=p1+ϵ1:p2+ϵ2:q3+ϵ3; and gcd(s,q3)=1   (1)

wherein
i=1,2,3 j=1,2,3 and i≠j;
δi=n2(λi)−n1(λi);
"ρij" represents a ratio of wavelengths or $$\rho ij = \frac{\lambda j}{\lambda i};$$

"p1", "p2" and "q3" represents any whole numbers;
"ϵi" represents a difference from whole numbers or $$\varepsilon i < \frac{0.2}{s-1};$$

and

"gcd(a,b)" represents the greatest common divisor of whole numbers a and b or

δ1:s·δ2·ρ12:s·δ3·ρ13=p1+ϵ1:q2+ϵ2:q3+ϵ3;

gcd(s,q2)=1; and gcd(s,q3)=1   (2)

wherein
"q2" represents any whole numbers.

6. An optical pickup including:
a first light source emitting a first wavelength λ1 of an optical beam;
a second light source emitting a second wavelength λ2 of an optical beam;
a third light source emitting a third wavelength λ3 of an optical beam;
a diffraction element including a first and second layer attached to one another and a diffraction pattern in which each of step-like protruding portions located at predetermined intervals between the first and second layers includes s steps, the first and second layers being respectively made from a first and second material through which the first, second and third wavelengths λ1, λ2 and λ3 of the optical beam pass; and
an objective lens collecting the first, second or third wavelength λ1, λ2 or λ3 of the optical beam from the diffraction element, the objective lens being integral with the diffraction element, wherein
the first material and the second material are selected such that the first material's refraction indexes n1(λ1), n1(λ2) and n1(λ3) for the first, second and third wavelengths λ1, λ2 and λ3 and the second material's refraction indexes n2(λ1), n2(λ2) and n2(λ3) for the first, second and third wavelengths λ1, λ2 and λ3 satisfy one of the following conditions (1) or (2):

δ1:δ2·ρ12:s·δ3·ρ13=p1+ϵ1:p2+ϵ2:q3+ϵ3; and $$gcd(s,q3)=1 \qquad (1)$$

wherein
i=1,2,3 j=1,2,3 and i≠j;
δi=n2(λi)−n1(λi);
"ρij" represents a ratio of wavelengths or $$\rho ij = \frac{\lambda j}{\lambda i};$$

"p1", "p2" and "q3" represents any whole numbers;
"ϵi" represents a difference from whole numbers or $$\varepsilon i < \frac{0.2}{s-1};$$

and
"gcd(a,b)" represents the greatest common divisor of whole numbers a and b
or δ1:s·δ2·ρ12:s·δ3·ρ13=p1+ϵ1:q2+ϵ2:q3+ϵ3;

gcd(s,q2)=1; and $$gcd(s,q3)=1 \qquad (2)$$

wherein
"q2" represents any whole numbers.

7. An optical disc apparatus comprising
an optical pickup emitting a first, second or third wavelength λ1, λ2 or λ3 of an optical beam to a first, second or third optical disc, the optical pickup including:
a first light source emitting the first wavelength λ1 of the optical beam for the first optical disc;
a second light source emitting the second wavelength λ2 of the optical beam for the second optical disc;
a third light source emitting the third wavelength λ3 of the optical beam for the third optical disc;
a diffraction element including a first and second layer attached to one another and a diffraction pattern in which each of step-like protruding portions located at predetermined intervals between the first and second layers includes s steps, the first and second layers being respectively made from a first and second material through which the first, second and third wavelengths λ1, λ2 and λ3 of the optical beam pass; and
an objective lens collecting the optical beam from the diffraction element to the first, second or third optical disc, the objective lens being integral with the diffraction element, wherein
the first material and the second material are selected such that the first material's refraction indexes n1(λ1), n1(λ2) and n1(λ3) for the first, second and third wavelengths λ1, λ2 and λ3 and the second material's refraction indexes n2(λ1), n2(λ2) and n2(λ3) for the first, second and third wavelengths λ1, λ2 and λ3 satisfy one of the following conditions (1) or (2):

δ1:δ2·ρ12:s·δ3·ρ13=p1+ϵ1:p2+ϵ2:q3+ϵ3; and $$gcd(s,q3)=1 \qquad (1)$$

wherein
i=1,2,3 j=1,2,3 and i≠j;
δi=n2(λi)−n1(λi);
"ρij" represents a ratio of wavelengths or $$\rho ij = \frac{\lambda j}{\lambda i};$$

"p1", "p2" and "q3" represents any whole numbers;
"ϵi" represents a difference from whole numbers or $$\varepsilon i < \frac{0.2}{s-1};$$

and
"gcd(a,b)" represents the greatest common divisor of whole numbers a and b
or δ1:s·δ2·ρ12:s·δ3·ρ13=p1+ϵ1:q2+ϵ2:q3+ϵ3;

gcd(s,q2)=1; and $$gcd(s,q3)=1 \qquad (2)$$

wherein
"q2" represents any whole numbers.

* * * * *